United States Patent
Dodge et al.

(10) Patent No.: US 9,014,530 B2
(45) Date of Patent: Apr. 21, 2015

(54) SYSTEM HAVING MOVIE CLIP OBJECT CONTROLLING AN EXTERNAL NATIVE APPLICATION

(75) Inventors: Dan Dodge, Nepean (CA); Paul Streatch, Richmond (CA); Roger Maclean, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 1140 days.

(21) Appl. No.: 12/190,380

(22) Filed: Aug. 12, 2008

(65) Prior Publication Data
US 2010/0040346 A1 Feb. 18, 2010

(51) Int. Cl.
| G06F 21/00 | (2013.01) |
| G06F 17/30 | (2006.01) |
| G06F 3/14 | (2006.01) |
| G09G 5/00 | (2006.01) |
| G11B 19/02 | (2006.01) |
| H04N 9/82 | (2006.01) |
| G09G 5/12 | (2006.01) |

(52) U.S. Cl.
CPC ........ *G06F 17/30056* (2013.01); *G11B 19/025* (2013.01); *H04N 9/8205* (2013.01); *G06F 2203/04808* (2013.01); *G06F 3/1415* (2013.01); *G09G 5/00* (2013.01); *G09G 5/12* (2013.01); *G09G 2320/0247* (2013.01); *G09G 2340/04* (2013.01); *G09G 2360/02* (2013.01)

(58) Field of Classification Search
CPC .............. G11B 19/025; H04N 9/8205; G06F 2203/04808
USPC .......................... 386/239, 240, 243, 246–248
See application file for complete search history.

(56) References Cited

U.S. PATENT DOCUMENTS

| 5,335,276 | A | 8/1994 | Thompson et al. |
| 5,465,401 | A | 11/1995 | Thompson |
| 5,467,413 | A * | 11/1995 | Barrett .......................... 382/236 |
| 6,192,255 | B1 | 2/2001 | Lewis et al. |
| 6,707,449 | B2 | 3/2004 | Hinckley et al. |

(Continued)

FOREIGN PATENT DOCUMENTS

| EP | 1 667 013 | 6/2006 |
| GB | 1 667 013 A2 * | 6/2006 |

OTHER PUBLICATIONS

Adobe Systems Incorporated, PDF Reference, fifth edition, 2004, Adobe Portable Document Format version 1.6, pp. 562 and 972; downloaded from http://wwwimages.adobe.com/content/dam/Adobe/en/devnet/pdf/pdfs/pdf_reference_archives/PDFReference16.pdf on Oct. 10, 2014.*

(Continued)

*Primary Examiner* — Carl Colin
*Assistant Examiner* — Gary Lavelle
(74) *Attorney, Agent, or Firm* — Brinks Gilson & Lione

(57) ABSTRACT

A system comprises a movie clip environment in which a movie clip object is defined, and a native application that is external to the movie clip environment. The native application renders an image to an off-screen surface of the system. A composition manager is responsive to communications from the movie clip object to control where the off-screen surface is to be rendered on a display screen. The composition manager may be responsive to communications from the movie clip object to direct the native application to control one or more properties of the image of the off-screen surface.

49 Claims, 7 Drawing Sheets

(56) References Cited

U.S. PATENT DOCUMENTS

| | | |
|---|---|---|
| 6,791,536 B2 | 9/2004 | Keely et al. |
| 6,892,359 B1 * | 5/2005 | Nason et al. ............... 715/788 |
| 6,975,306 B2 | 12/2005 | Hinckley et al. |
| 7,231,516 B1 * | 6/2007 | Sparrell et al. ............. 713/156 |
| 7,382,358 B2 | 6/2008 | Kushler et al. |
| 7,797,630 B2 | 9/2010 | Kashi |
| 2005/0052458 A1 | 3/2005 | Lambert |
| 2005/0110964 A1 | 5/2005 | Bell et al. |
| 2005/0259968 A1 * | 11/2005 | Tsumagari et al. ............ 386/95 |
| 2006/0005114 A1 * | 1/2006 | Williamson et al. .......... 715/502 |
| 2006/0182411 A1 * | 8/2006 | Loo ................................ 386/52 |
| 2006/0242592 A1 | 10/2006 | Edwards et al. |
| 2007/0067305 A1 * | 3/2007 | Ives ............................... 707/10 |
| 2007/0124503 A1 | 5/2007 | Ramos et al. |
| 2008/0082907 A1 * | 4/2008 | Sorotokin et al. ............ 715/210 |
| 2008/0168073 A1 * | 7/2008 | Siegel et al. .................. 707/100 |
| 2008/0316183 A1 | 12/2008 | Westerman et al. |

OTHER PUBLICATIONS

International Preliminary Report on Patentability from corresponding international application No. PCT/IB2009/006515, 10pgs, dated Feb. 24, 2011.

Lei Wang et al., Design and Implementation of a Novel User Interface for Embedded Systems, International Symposium on the Intelligent Information Technology Application Workshops, pp. 247-250, IEEE 2008.

International Search Report from International Application No. PCT/IB2009/006515, dated Feb. 26, 2010.

Office Action dated Apr. 30, 2013 in corresponding CA Application No. 2,733,527, pp. 1-3.

* cited by examiner

SYSTEM HAVING MOVIE CLIP OBJECT CONTROLLING AN EXTERNAL NATIVE APPLICATION

BACKGROUND OF THE INVENTION

1. Technical Field

The present invention relates to a system for integrating a movie-clip application environment with native applications.

2. Related Art

Devices that display images are used in many of applications. MP3 players may display images of an artist and/or album artwork associated with its stored media content. Video players may display streaming video from a memory storage device, a private network, and/or the Internet.

Some devices provide an interface to interact with the device. The interface may include a hardwired interface and/or a virtual interface. Hardwired interfaces may include push-button switches, rotary switches/potentiometers, sliders, and other mechanical based items. Virtual interfaces may be implemented using virtual buttons, virtual sliders, or virtual rotator controls. In a combined interface, function identifiers may be generated on a display adjacent to mechanical elements.

The development of a virtual interface and/or display may become complicated when multiple applications are used to implement the interface. A complicated action may occur when the interface displays an image and/or images from different applications. Still images and/or video images may be integrated into a single application package for playback. This approach limits still images and/or video playback to the images and/or video integrated with the application. Other approaches may be complicated and require extensive use of a non-standard virtual interface development environment.

SUMMARY

A system comprises a movie clip environment in which a movie clip object is defined, and a native application that is external to the movie clip environment. The native application renders an image to an off-screen surface of the system. A composition manager is responsive to communications from the movie clip object to control where the off-screen surface is to be rendered on a display screen. The composition manager may be responsive to communications from the movie clip object to direct the native application to control one or more properties of the image of the off-screen surface.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The inventions may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
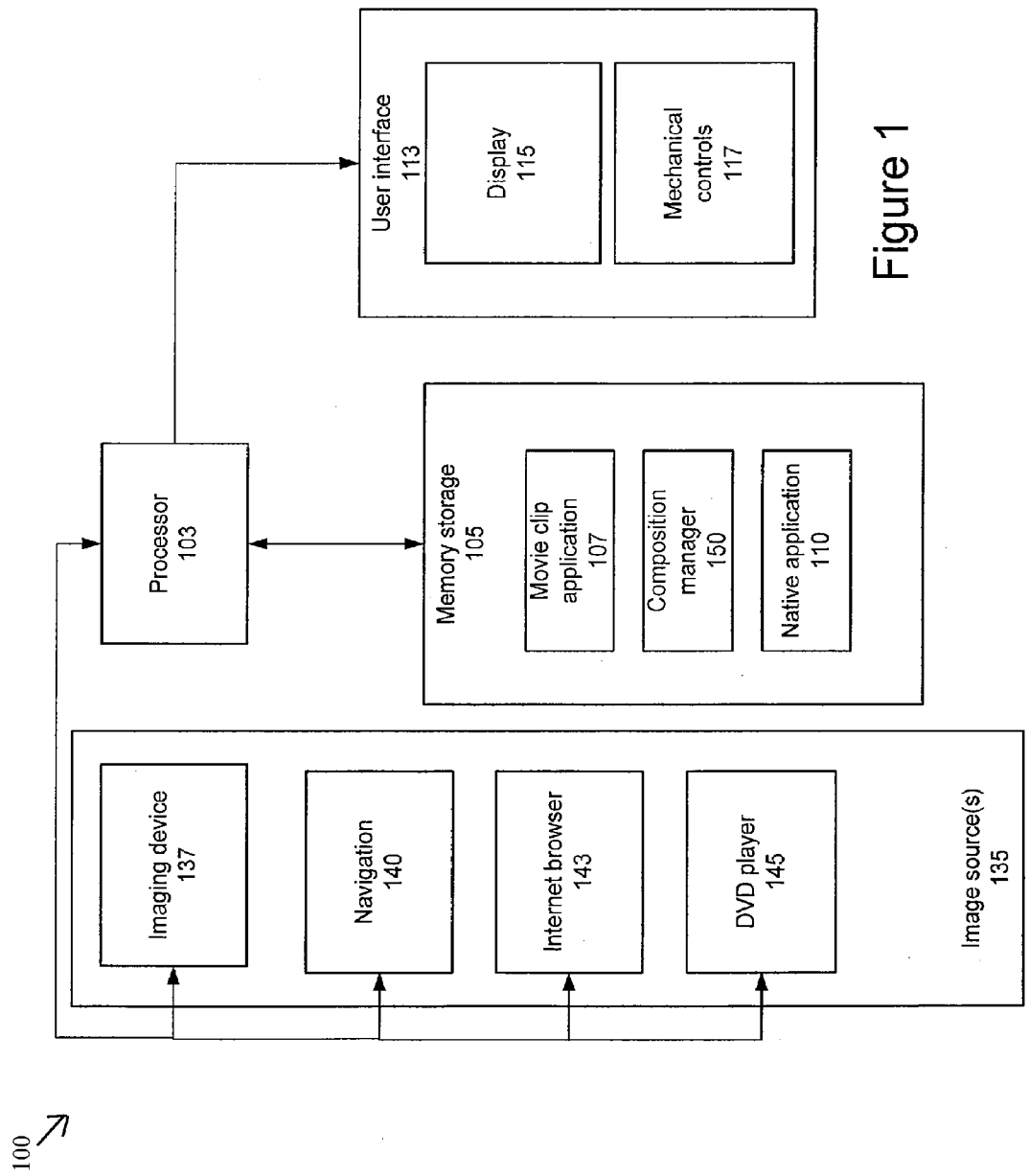
FIG. 1 is a system that uses a movie clip object in a movie clip environment to control a property of an off-screen image rendered by a native application.

FIG. 1 shows a system 100 that controls native hardware applications using one or more objects of a movie-clip based environment. In FIG. 1, system 100 may form composite images from multiple applications for display with one another. System 100 combines an image from a movie clip application, such as a user interface application that generates one or more user interface images/controls, with an image from a native application.

System 100 may include a processor 103 that may interface with local or distributed memory storage 105. Memory storage may include a movie clip application 107 and a native application 110 that is external or remote to the movie clip application environment. The native application 110 may generate one or more images internally or from various image sources. Movie clip application 107 is executable by the processor 103 and may determine how a user interacts with system 100 through an input such as a user interface 113. User interface 113 may include a display 115, such as a touchscreen display, and/or mechanical controls 117.

The processor 103 may interface two, three, or more image sources 135 that may be controlled by one or more native applications 110. The native application 110 may be executed by the processor 103 and may receive image information from the image sources 135. In FIG. 1, the image sources 135 may include an imaging device 137 (e.g., an output of a still camera, a video camera, a scanner, or other image acquisition device), a navigation device 140, an Internet browser 143, and/or a DVD player 145 to provide images, still or video, from optical media storage. The movie clip application 107 and native application 110 may communicate with a composition manager 150.

Figure 2:
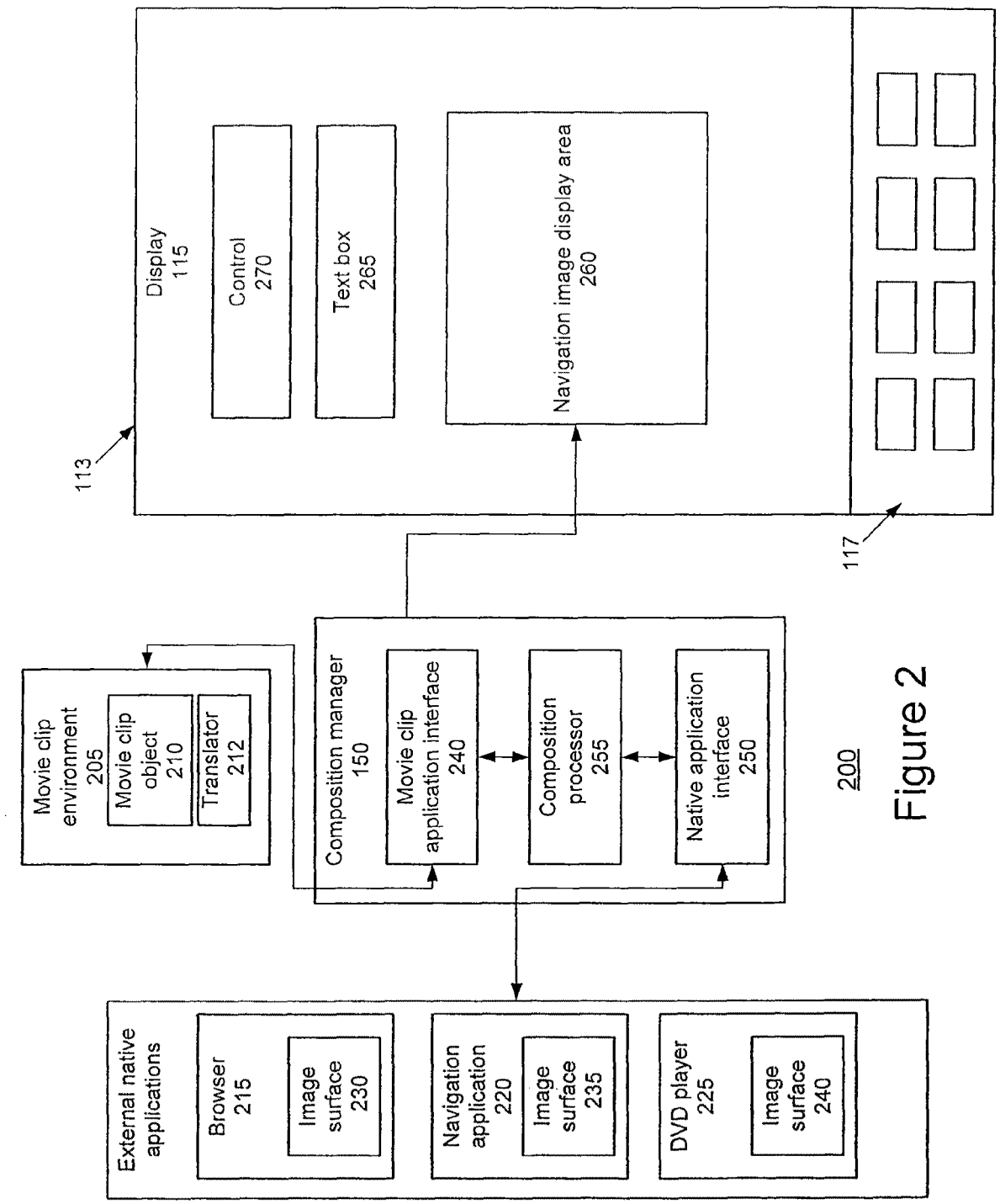
FIG. 2 is a system diagram of the interactions between the components shown in the system of FIG. 1.

FIG. 2 shows a system 200 in which the movie clip application 107 and native application 110 may cooperate with the composition manager 150 to implement user interface 113. In FIG. 2, the user interface 113 includes display 115, such as a touchscreen display, and mechanical controls 117. The movie clip application 107 may be executed in a movie clip environment 205 and may include an Adobe® FLASH® player, or similar movie clip application, that may be adapted to play one or more .swf files associated with the interface 113. The .swf files may include various movie clip controls and objects employed by the user interface 113. Such an environment may be well suited for developing user interfaces that employ vector graphics, images, and text.

Movie clip environments, such as those associated with Adobe® Flash® are well suited for producing user interfaces since they may provide powerful tools for manipulating graphics to implement graphical user interfaces. Such tools may reduce the amount of programming needed to build flashy, dynamic interfaces that may be compliant with consumer electronics. However, the image surfaces displayed by a movie clip application may be limited to the types of objects for which such movie clip environments are designed. In some instances, the movie clip environment may be limited to vector graphics objects, image objects, and text objects. This may work well if the entire user interface may be programmed in the movie clip environment. However, this approach may not be suitable when the user interface includes one or more native applications that are external to the movie clip environment that render their own images for use within the movie clip environment. For example, the display requirements for a Web browser may be complex and the transmission of a description of a Web page for rendering in the movie clip environment may be challenging. Since a use for these user interfaces are for devices with relatively small screens, the rendering area available to a windowing environment may be limited. Therefore, it may be desirable to render devices that appear to a user as if an entire user interface is built into a movie clip environment. In some systems the interface comprises a composite of a number of independent applications.

The movie clip application 117 may generate one or more movie clip objects. In FIG. 2, a movie clip object 210 is shown in environment 205. A number of native applications that may be external to the movie clip environment are also shown. The native applications may include a browser 215, a navigation application 220, and a DVD player 225. Each external application may render its corresponding image to respective image memory areas and/or surfaces 230, 235, and 240. The surfaces 230, 235, and 240 may be stored in video memory, random access memory, or other memory storage configuration. Image memory areas/surfaces may not be directly rendered to the display 115 of the user interface 113 by the external applications. Rather, the external applications provide information regarding their respective surfaces 230, 235, and 240, to the composition manager 150.

The composition manager 150 may be responsive to the commands and/or data generated by the movie clip object 210 to control one or more properties of the off-screen surface for rendering to the display 115. The movie clip object 210 may be generated using a scripting language associated with the movie clip environment. Object creation, manipulation, data entry, or other command/data triggering events using the movie clip object 210 may generate commands and/or data associated with a corresponding external native or remote application. The commands and/or data generated by the movie clip object 210 may be conveyed to a command translator 212 that translates the scripted commands and/or data into a format for provision to the composition manager 150 through a movie clip application interface 240. There may be a movie clip object respectively associated with each external native application 215, 220, 225 that is controlled from the movie clip environment 205. Each movie clip object may include scripted commands and/or data specifically designed for use with the corresponding external native application.

The composition manager 150 may communicate with the external native applications 215, 220, and 225 through a native application interface 250. Each native application 215, 220, and 225 may provide a variety of information relating to its operation. Such information may include a unique identifier that may be used within the movie clip environment to identify a particular native application, the location of the image surface of the native application, the size of the image surface of the native application, a generic application type identifier, and other such information.

Through the translator 212, movie clip object 210 may direct the composition manager 150 to provide one or more of the off-screen surfaces 230, 235, and/or 240, for rendering to the display 115. In FIG. 2, the movie clip object 210 is associated with the navigation application 220 and has directed the composition manager 150 to display the navigation application surface 235 in area 260 of the display 115. Additionally, or alternatively, the movie clip object 210 may direct the composition manager 150 to display the DVD player surface 240 and/or browser surface 230 in one or more areas of the display 115. Multiple movie clip objects may be layered in the movie clip environment 205 (e.g., concurrently) for each of the external native applications 215, 220, and 225. A movie clip object may be associated with a particular native application in the system 200 that, in turn, may be controlled through the composition manager 150.

Communications received through movie clip application interface 240 and native application interface 250 may be processed by a composition processor 255. The composition processor 255 receives commands through the movie clip application interface 240 and accesses the corresponding image surface 230, 235, and/or 240. The composition processor 255 uses the commands to control one or more properties of one or more of the image surfaces 230, 235, and/or 240. Data and/or commands that are provided from the movie clip object 210 through the movie clip application interface 240 may be processed and/or channeled through the composition processor 255 for provision to a corresponding native application through the native application interface 250.

A number of different commands may be provided from the movie clip object 210 to the corresponding native application through the composition manager 150. Such commands may be used to direct the native application to render its surface in a particular manner. Commands that may be directed to the native application may include: 1) rotating the rendered surface in a two-dimensional and/or three-dimensional manner; 2) controlling the size of the rendered surface; 3) controlling the resolution of the rendered surface; 4) controlling color characteristics of the rendered surface; 4) instructing the native application to render its surface in a manner substantially similar to any other commands used in the movie clip environment to render its own surfaces. In this manner, the native application may appear to a user as though it is part of the movie clip environment.

Movie clip object 210 may shadow one or more of the external native applications. In system 200, the movie clip object 210 may define one or more text boxes 265 and/or controls 270. Data provided into the text boxes 265 may be channeled through the composition manager 150 for provision to one or more of the external native applications for processing. Actuation of control 270 may be channeled to the composition manager 150 for provision to one or more of the external native applications for processing. Absolute and/or relative pointing device movement (e.g., mouse movement) and selection information may also be provided to the shadowed native application through the composition manager 150. In response to the text, mouse movement, mouse selection, and/or control actuation, the corresponding native application may change the image provided to its respective image surface. The native application may provide data and/or other information indicating this changed image surface state to the composition manager 150. Although a single movie clip object 210 may define a visible display surface for display 115, controls 270 and text input boxes 265 may be provided by different movie clip objects that shadow the external native application.

The composition manager 150 may be executed by one or more processors in a single or multiprocessor environment and implemented in any of a number of software authoring languages. The composition manager 150 and/or external native applications 215, 220, and 225 may be written in an integrated development environment including a software language, such as C, C+, C++, or similar software language retained in a memory. The composition manager 150 may comprise or may be part of a component and/or object of the integrated development environment. Additionally, or in the alternative, the composition manager 150 may be packaged for deployment along with a movie clip development environment. Movie clip objects associated with one or more of the external native applications employed in the system 200 may be packaged with the integrated development environment and/or the movie clip development environment. In this configuration, a software developer may treat external native applications as objects within the movie clip development environment and, as such, within movie clip environment 205. It may further reduce the complexity of programming a user interface by a developer may be reduced.

The composition manager 150 may be responsive to all commands or a subset of the commands available to a movie clip object in the movie clip environment 205. Such commands may include: whether or not a particular surface is to be displayed on the display 115, the positioning of an image from one or more of the image surfaces 230, 235, and 240 on the display 115; rotating the image on display 115 along a two-dimensional or three-dimensional shape path; altering the color characteristics of the image, and other similar object-based commands. Further, the movie clip object 210 may dictate whether the movie clip object is itself be treated as an off-screen surface.

In this architecture, the external applications do not necessarily have to include software that is cognizant about where their surfaces are currently displayed or otherwise to be displayed on the display 115. Rather, the external native applications may render into their respective surfaces, and objects generated by the movie clip application 107 direct the composition manager 150 as to where everything is to be placed on the display 115. The movie clip application 107 may synchronize changes of its content with the position of images from other native applications to minimize display flickering.

Further, the native applications need not be tied to particular hardware display layers in this architecture. It is therefore possible, although not necessary, to use more applications than may be employed in systems in which the external applications are tied to a particular hardware display layer. The composition manager 150 may make use of hardware display layers to make some of software coding and operations more efficient, but the complexities do not have to be present in all applications since such complexities may be handled by the composition manager 150.

Figure 3:
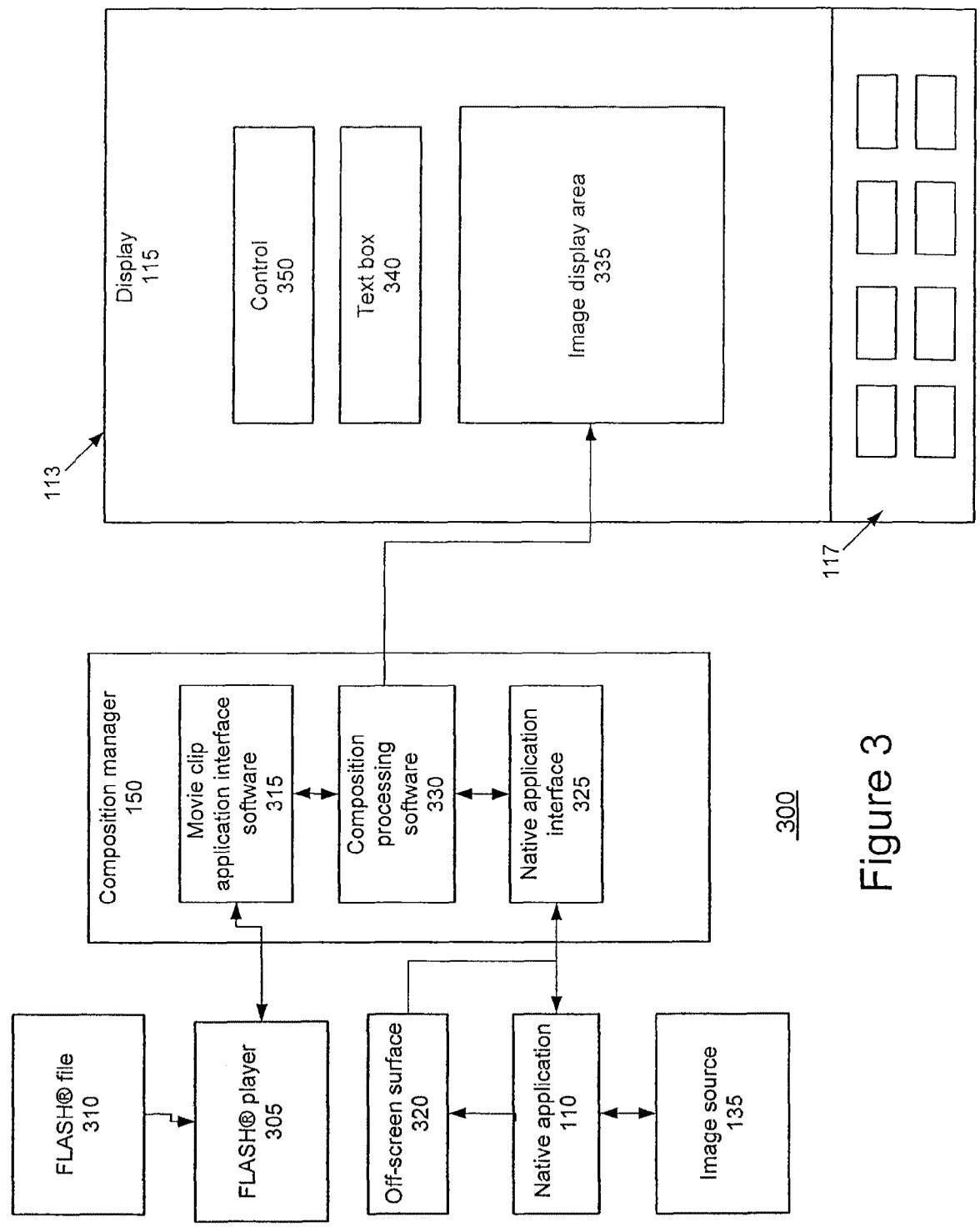
FIG. 3 shows how the system of FIG. 1 may be implemented in a FLASH® environment.

FIG. 3 shows another system 300 having a user interface 113. In system 300, a movie clip player 305 is used to play a movie clip file 310. The movie clip player 305 may execute the movie clip file 310 to generate one or more objects that provide commands to the composition manager 150 through movie clip application interface software 315 of the composition manager 150. External native application 110 renders its surface to an off-screen surface 320. The off-screen surface 320 may reside in video memory, random access memory, or any other memory storage configuration. The native application 110 may generate its own image to the off-screen surface 320 or provide an image from an image source 135 for provision to the off-screen surface 320. The composition manager 150 may receive information regarding the native application 110 as well as information relating to the off-screen surface 320 through native application interface software 325. Data, commands, and/or information received by the movie clip application interface software 315 and the native application interface software 325 may be provided to composition processing software 330. The composition manager 150 may also access the off-screen surface 320 through the native application interface software 325.

Composition processing software 330 may use the data, commands, and/or information to control where the images of the off-screen surface 320 are rendered on the display 115. In FIG. 3, the display 115 includes an image display area 335, a text box 340, and a control area 350. Control area 350 may include one or more movie clip controls that may send commands to the composition manager 150. Additionally, or in the alternative, the movie clip controls 350 may send commands and/or other information to further layers of the movie clip file 305. Image display area 335 may correspond to the image stored in the off-screen surface 320 and may be sourced from the off-screen surface area 320 through the composition manager 150. The composition manager 150 may respond to commands received from the corresponding movie clip object to direct the native application to control the properties of the image residing in the off-screen surface 320. Although particular positional relationships between the various movie clips on display 115 are shown in FIG. 3, these relationships may be altered using commands received from one or more movie clip objects of the movie clip file 310.

The user interface 113 may be readily changed by playing back a different Adobe® FLASH® file 310 having different movie clip objects that control images provided from an off-screen surface rendered by a native application. This functionality may change the user interface 113 in response to changes in the image source 135 and/or native application 110. When the image source 135 is a DVD player, an Adobe® FLASH® file 310 having controls corresponding to a DVD player may generate the user interface 113 and the off-screen image surface corresponding to the images provided by the DVD player may be provided to display 115. Controls in area 350 may correspond to such functions as play, rewind, forward, reverse, volume, and other DVD player functions. When a control is manipulated by a user, its function may be directed to the composition manager 150 for provision to the native application 110. The native application 110 may either execute the requested function or deny its execution. If denied, the native application 110 may update its off-screen surface 320 accordingly so that the user is made aware of the denial.

Figure 4:
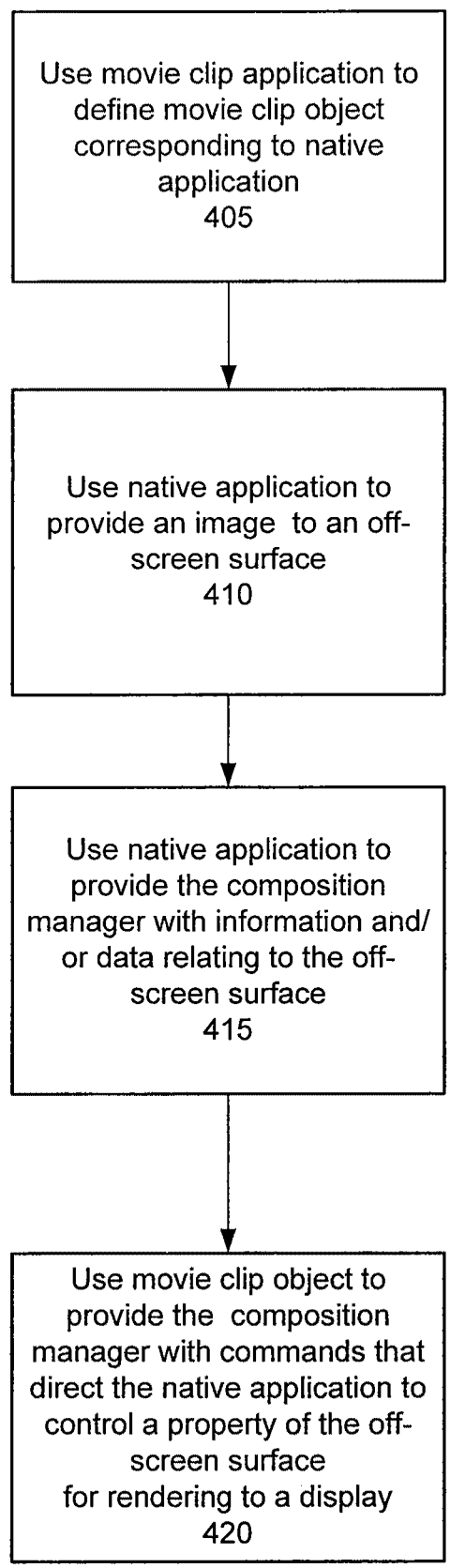
FIG. 4 shows process in which a movie clip object in a movie clip environment may control a property of an off-screen image rendered by a native application.

FIG. 4 shows a process for controlling the display of an image rendered by a native application using a movie clip object. At 405, a movie clip application, such as a user interface application, may define a movie clip object corresponding to a native application. At 410, the native application provides an image to an off-screen surface. The native application provides a composition manager with information and/or data relating to the off-screen surface at 415. The movie clip object provides the composition manager with a command at 420. The composition manager uses the command to direct the native application to control a property of the off-screen surface for rendering to a display. In providing commands to the native application, the composition manager may use the information and/or data provided by the native application at 415.

Figure 5:
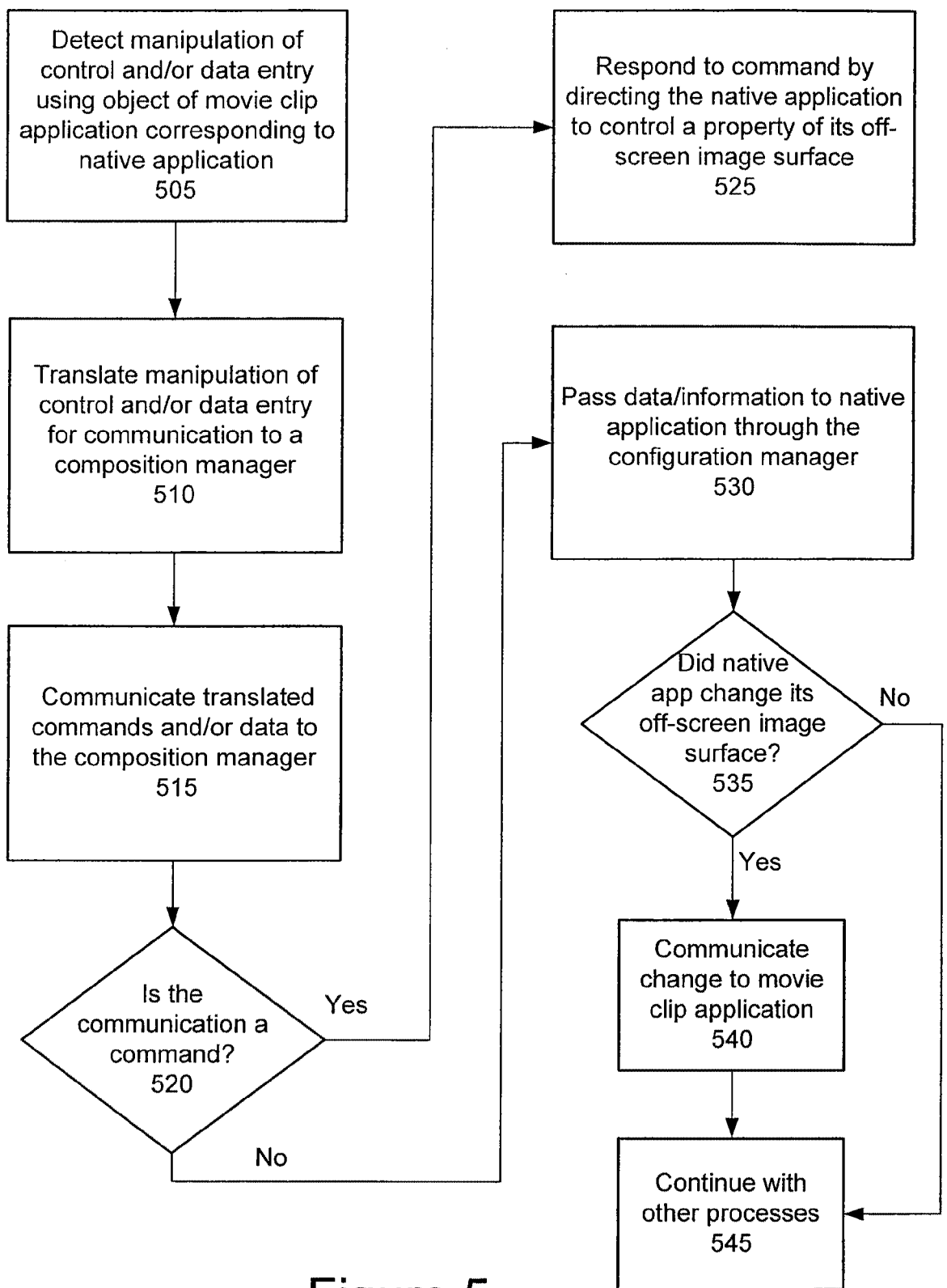
FIG. 5 is a process that responds to the manipulation of a movie clip control and/or data entry control of a movie clip object associated with a native application.

FIG. 5 shows a process for handling command and/or data entry using an object of a movie clip application. At 505, the process detects manipulation of a control and/or data entry using an object of the movie clip application. The object of the movie clip application corresponds to a given native application. The manipulation of the control and/or data entry of the object is translated for communication to a composition manager at 510. The translated information is communicated to the composition manager at 515. At 520, the process determines whether the communication is a command (or data). If it is a command, at 525 the composition manager responds to the command by directing the corresponding native application to control a property of its off-screen image surface. If it is a data entry, the data/information may be passed to the native application through the configuration manager at 530. At 535, the process determines whether the native application has changed its off-screen image surface in response to the data/information communicated from the configuration manager. If the off-screen image surface has been changed by the native application, this change may be communicated to the movie clip application through the configuration manager at 540. If the off-screen image surface has not changed, the system may continue with other processes at 545.

Figure 6:
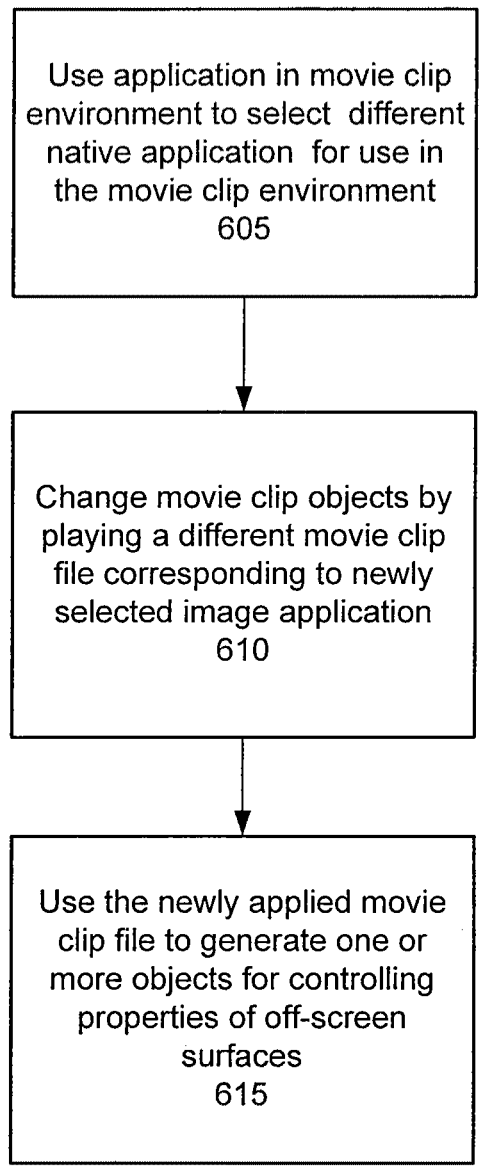
FIG. 6 is a process that changes a movie clip application in response to changes of a subject native application.

FIG. 6 shows a process in which a movie clip application, such as a user interface application, may be changed in response to selection of a new native application. At 605, a request for a different native application is requested from a movie clip application executed within the movie clip environment. The movie clip application may respond to this change by changing the movie clip objects that it is currently using. At 610, the movie clip objects may be changed by playing a different movie clip file corresponding to the newly requested native. At 615, the newly applied movie clip file is used in to generate one or more objects for controlling properties of one or more off-screen surfaces rendered by the newly selected native application.

Figure 7:
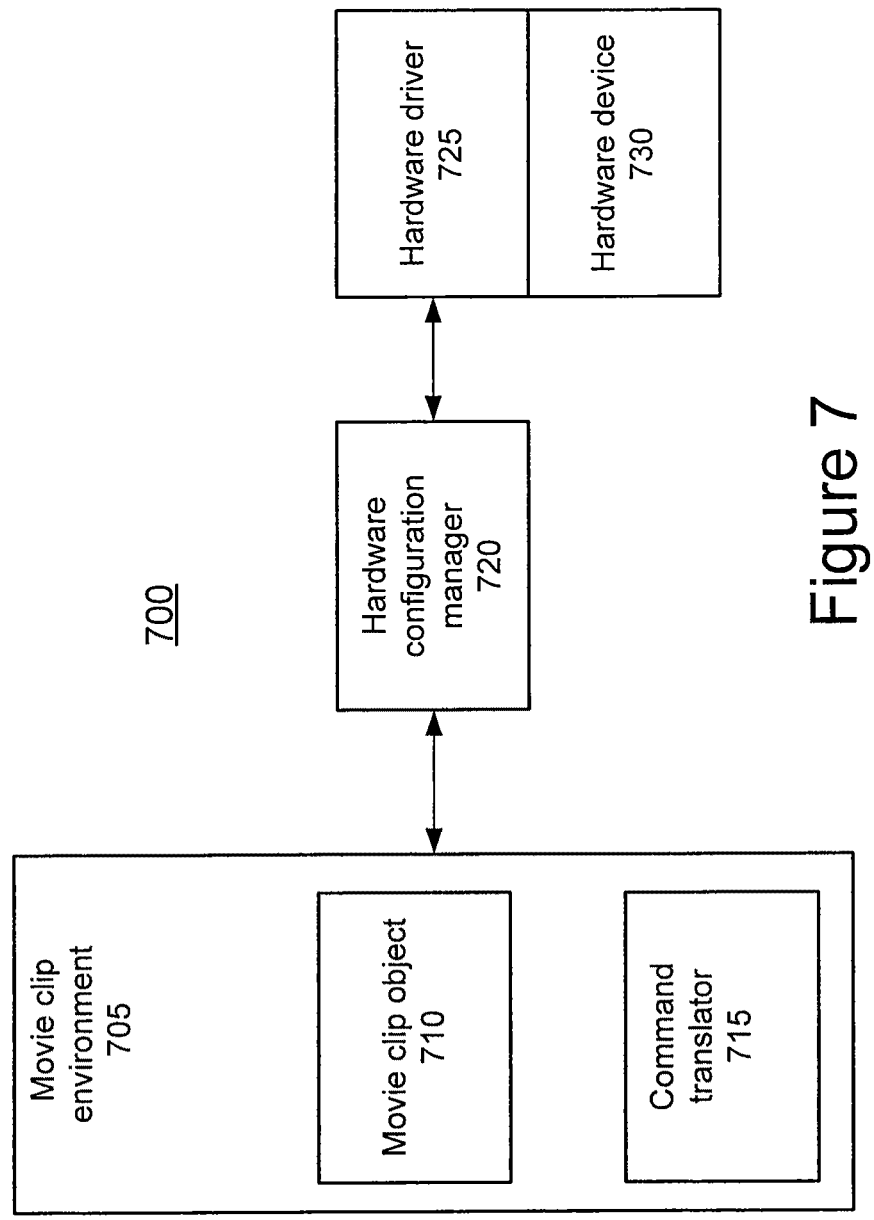
FIG. 7 is a system in which a movie clip object controls a hardware component.

FIG. 7 shows a system 700 in which a hardware device may be controlled from within a movie clip environment 705. In system 700, a movie clip object 710 corresponding to a hardware device 730 is generated in the movie clip environment 705. Commands initiated by the movie clip object 710 for provision to the hardware device 730 are communicated to a command translator 715 in the movie clip environment 705. The translated commands are communicated to a hardware configuration manager 720. The hardware configuration manager 720 communicates commands corresponding to the translated commands to a hardware driver 725 for the device 730. The hardware driver 725 executes the commands that it receives to control the hardware device 730.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The methods and descriptions set forth above may be encoded in a signal bearing medium, a computer readable medium or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory remote from or resident to the device. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

We claim:
1. A system comprising:
one or more hardware processors or circuits that are operable to execute:
a movie clip environment in which a plurality of movie clip objects are defined, where each movie clip object displays controls on a display screen for user interaction with an image provided by an external native application, and each of the plurality of movie clip objects generates scripted commands that are communicated to a composition manager for controlling an image provided by a respective external native application;
a plurality of external native applications that are external to the movie clip environment, wherein:
 each of the plurality of movie clip objects is associated with a particular external native application and a respective off-screen surface of the respective external native application for rendering of an image by the external native application;
 each of the plurality of external native applications is associated with information including a unique identifier that is used in the movie clip environment to identify the external native application and a location of its respective off-screen surface; and
 each of the plurality of external native applications generates or receives an image and renders the image to its respective off-screen surface of the system; and a composition manager that is communicatively coupled to the plurality of external native applications and the plurality of movie clip objects, the composition manager being operable to:
receive the information about each of the off-screen surfaces from their respective external native applications;
receive scripted commands from each of the plurality of movie the clip objects for each movie clip object's corresponding external native application wherein:
a scripted command of a particular movie clip object directs the composition manager to provide an image rendered by its corresponding external native application on an off-screen surface to a display screen;
the scripted command from the particular movie clip object controls where the image is to be placed on the display screen through the composition manager; and
the scripted commands from the plurality of movie clip objects direct the composition manager as to where all of the images rendered by the corresponding external native applications on their respective off-screen surfaces are to be placed on the display screen.

2. The system of claim 1, where the composition manager is responsive to communications from each movie clip object to direct the corresponding external native application to control a property of the respective off-screen surface and the corresponding external native application communicates changes made to the respective off-screen surface to the movie clip object through the composition manager.

3. The system of claim 2, where the property of the off-screen surface comprises rotation of the image of the off-screen surface.

4. The system of claim 1, where the external native applications provide information about the off-screen surfaces to the composition manager.

5. The system of claim 1, where each movie clip object shadows a corresponding external native application to pass mouse movement, mouse selection, and text input to the shadowed external native application through the composition manager.

6. The system of claim 1, where the composition manager is responsive to communications from the movie clip objects to determine whether the off-screen surfaces are visible on the display screen.

7. The system of claim 2, where the property of the off-screen surface comprises a size of the off-screen surface.

8. The system of claim 2, where the property of the off-screen surface comprises a resolution of the off-screen surface.

9. The system of claim 1, further comprising a plurality of movie clip objects associated with a plurality of off-screen surfaces rendered by respective external native applications, where each movie clip is respectively associated with an off-screen surface.

10. The system of claim 1, where the external native applications comprise a web browser.

11. The system of claim 1, where the external native applications comprise a DVD player application.

12. The system of claim 1, where the external native applications comprise a navigation application.

13. A system comprising:
movie clip environment means comprising one or more hardware processors or circuits for generating a plurality of movie clip objects, where the movie clip environment means displays controls on a display screen for user interaction with an image provided by an external native application means and each of the plurality of movie clip objects generates scripted commands that are communicated to a composition manager means for controlling an image provided by a respective external native application;
a plurality of external native application means comprising one or more hardware processors or circuits that are external to the movie clip environment means, wherein:
each of the plurality of movie clip object means is associated with a particular external native application means and a respective off screen surface of the particular external native application means for rendering of an image by the external native application means,
each of the plurality of external native application means is associated with information including a unique identifier that is used in the movie clip environment means to identify the external native application means and a location of a respective off-screen surface of the external native application means; and
each of the plurality external native application means generates or receives an image and renders the image to its respective off-screen surface of the system that is external to the movie clip environment; and
composition manager means comprising one or more hardware processors or circuits that is communicatively coupled to the plurality of external native application means and the plurality of movie clip object means and is operable to:
receive the information about each of the off-screen surfaces from their respective external native applications means,
receive scripted commands from each of the plurality of movie the clip objects for each movie clip object's corresponding external native application means wherein:
a scripted command of a particular movie clip object directs the composition manager means to provide an image rendered by its corresponding external native application means on an off-screen surface to a display screen;
the scripted command from the particular movie clip object controls where the image is to be placed on the display screen through the composition manager means; and
the scripted commands from the plurality of movie clip objects direct the composition manager means as to where all of the images rendered by the corresponding external native application means on their respective off-screen surfaces are to be placed on the display screen.

14. The system of claim 13, where the composition manager means is responsive to communications from the movie clip object means to direct the external native application means to control a property of a respective off-screen surface.

15. The system of claim 14, where the property of the respective off-screen surface comprises a resolution of the off-screen surface.

16. The system of claim 13, where the external native application means provide information about the off-screen surfaces to the composition manager means.

17. The system of claim 13, where the movie clip objects shadow the external native application means to pass mouse movement, mouse selection, and text input to the shadowed external native application means through the composition manager means.

18. The system of claim 14, where the property of the respective off-screen surface comprises a size of the off-screen surface.

19. The system of claim 14, where the property of the respective off-screen surface comprises rotation of the image of the off-screen surface.

20. The system of claim 14, where the property of the respective off-screen surface comprises a color characteristic of the image of the respective off-screen surface.

21. The system of claim 13, further comprising a plurality of movie clip objects associated with a plurality of off-screen surfaces rendered by respective external native application means, where each movie clip is respectively associated with an off-screen surface.

22. The system of claim 13, where the external native application means comprises a web browser.

23. The system of claim 13, where the external native application means comprises a DVD player application.

24. The system of claim 13, where the external native application means comprises a navigation application.

25. A method for operating a processing system comprising:
    in one or more hardware processors or circuits:
    defining a plurality of movie clip objects in a movie clip environment, where each of the movie clip objects displays controls on a display screen for user interaction with an image provided by a respective external native application and each of the plurality of movie clip objects generates scripted commands that are communicated to a composition manager for controlling a property of the image provided by the respective external native application;
    rendering by a plurality of external native applications, each associated with a corresponding movie clip object, an image to a respective off-screen surface;
    controlling by the movie clip objects a property of the respective off-screen surfaces rendered by the external native applications through a composition manager, where the property corresponds to a property associated with rendering of the respective off-screen surfaces to the display screen; and
    responding, by the composition manager, to the scripted commands from each of the movie clip objects by:
        directing the respective external native applications to control the properties of the images residing in the respective off-screen surfaces based on the scripted commands from the respective movie clip objects; and
        providing the images residing in the respective off-screen surfaces to the display screen based on the scripted commands from the respective movie clip objects.

26. The method of claim 25, where the property of the respective off-screen surfaces comprises rotation of an image of the off-screen surface.

27. The method of claim 25, where the property of the respective off-screen surfaces comprises a resolution of the off-screen surface.

28. The method of claim 25, further comprising using the movie clip objects to shadow the external native applications to pass mouse movement, mouse selection, and text input to the shadowed external native application.

29. The method of claim 25, where the property of the respective off-screen surfaces comprises a position of the off-screen surface with respect to the display screen.

30. The method of claim 25, where the property of the off-screen surfaces comprises a size of the off-screen surfaces.

31. A system comprising:
    one or more hardware processors or circuits that are operable to execute:
    a movie clip environment in which a plurality of movie clip objects are defined, where each movie clip object displays controls on a display screen for user interaction with a an image provided by a respective external native application and each of the plurality of movie clip objects generates scripted commands that are communicated to a composition manager for controlling a property of the image provided by the respective external native application;
    a plurality of external native applications that are external to the movie clip environment, wherein:
        each of the plurality of movie clip objects is associated with a particular external native application;
        each of the plurality of external native applications is associated with a unique identifier that is used in the movie clip environment to identify the external native application and a location of a respective off-screen surface of the external native application; and
        each of the plurality of external native applications renders an image to its respective off-screen surface of the system; and
    a composition manager that is communicatively coupled to the plurality of external native applications and the plurality of movie clip objects and is operable to:
        receive information about a plurality of off-screen surfaces from their respective external native applications;
        receive scripted commands from each of the plurality of movie clip objects for each movie clip object's respective external native application;
        direct the respective external native applications to control a property of the images residing on the respective off-screen surfaces based on the scripted commands from each of the plurality of movie clip objects; and
        provide the images residing on the respective off-screen surfaces to the display screen based on the scripted commands from each of the plurality of movie clip objects.

32. The system of claim 31, where the property of the respective off-screen surface comprises rotation of the image of the off-screen surface.

33. The system of claim 31, where the property of the respective off-screen surface comprises a resolution of the off-screen surface.

34. The system of claim 31, where the external native application provides information about the respective off-screen surface to the composition manager.

35. The system of claim 31, where the movie clip object shadows the external native application to pass mouse movement, mouse selection, and text input to the shadowed external native application.

36. The system of claim 31, where the composition manager is responsive to communications from the corresponding movie clip object to determine whether the respective off-screen surface is to be visible on the display screen.

37. The system of claim 31, where the property of the respective off-screen surface comprises a size of the off-screen surface.

38. The system of claim 31, further comprising a plurality of movie clip objects associated with a plurality of off-screen surfaces rendered by respective external native applications, where each movie clip object is respectively associated with an off-screen surface.

39. The system of claim 31, where the external native applications comprise a web browser.

40. The system of claim 31, where the external native applications comprise a DVD player application.

41. The system of claim 31, where the external native applications comprise a navigation application.

42. The system of claim 1, where screen interactions are communicated to the composition manager by the movie clip objects.

43. The system of claim 1, where the movie clip objects produce a user interface comprising any of controls, vector graphic objects, images objects, and text objects.

44. The system of claim 13, where screen interactions are communicated to the composition manager means by the movie clip objects.

45. The system of claim 13, where the movie clip objects produce a user interface comprising any of controls, vector graphic objects, images objects, and text objects.

46. The method of claim 25, further comprising communicating screen interactions to a composition manager using the movie clip objects.

47. The method of claim 25, where the movie clip objects produce a user interface comprising any of controls, vector graphic objects, images objects, and text objects.

48. The system of claim 31, where screen interactions are communicated to the composition manager by the movie clip objects.

49. The system of claim 31, where the movie clip objects produce a user interface comprising any of controls, vector graphic objects, images objects, and text objects.

\* \* \* \* \*